United States Patent
Jacobson et al.

(10) Patent No.: US 9,936,203 B2
(45) Date of Patent: Apr. 3, 2018

(54) COMPLEX REGION DETECTION FOR DISPLAY STREAM COMPRESSION

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 15/078,797

(22) Filed: Mar. 23, 2016

(65) Prior Publication Data

US 2016/0301933 A1  Oct. 13, 2016

Related U.S. Application Data

(60) Provisional application No. 62/146,913, filed on Apr. 13, 2015.

(51) Int. Cl.
*G06K 9/36* (2006.01)
*H04N 19/14* (2014.01)
(Continued)

(52) U.S. Cl.
CPC .......... *H04N 19/14* (2014.11); *H04N 19/124* (2014.11); *H04N 19/174* (2014.11);
(Continued)

(58) Field of Classification Search
USPC ............. 1/1; 348/14.13; 375/240.01, 240.03, 375/240.08, 240.24
See application file for complete search history.

(56) References Cited

U.S. PATENT DOCUMENTS 5,933,451 A * 8/1999 Ozkan ................ H04N 21/2365
348/353
7,039,108 B2 * 5/2006 Bauer .................. H04N 19/172
375/240.08

(Continued)

FOREIGN PATENT DOCUMENTS

| EP | 2348734 A1 | 7/2011 |
| JP | H06245199 A | 9/1994 |
| WO | WO-199716029 A1 | 5/1997 |

OTHER PUBLICATIONS

Walls F., et al., "VESA Display Stream Compression", Mar. 3, 2014 (Mar. 3, 2014), pp. 1-5, XP002751573, Retrieved from the Internet: URL: "http://www.vesa.org/wp-content/uploads/2014/04/VESA_DSC-ETP200.pdf", on-Nov. 27, 2015].

(Continued)

*Primary Examiner* — Xuemei Chen
(74) *Attorney, Agent, or Firm* — Knobbe, Martens, Olson & Bear, LLP (57) ABSTRACT

A method and apparatus for detecting a complex region of an image are disclosed. In one example, the method may involve calculating complexity values for a current block, a next block, and a previous block. The method may involve: (i) detecting that the previous complexity value is less than a first threshold value, and that the next complexity value is greater than a second threshold value; and (ii) determining that neither a transition to the current block nor a transition to the previous block is a flat-to-complex region transition. The method may involve detecting a flat-to-complex region transition when transitioning to the next block in response to (i) and (ii).

30 Claims, 7 Drawing Sheets

(51) Int. Cl.
*H04N 19/174* (2014.01)
*H04N 19/176* (2014.01)
*H04N 19/186* (2014.01)
*H04N 19/61* (2014.01)
*H04N 19/124* (2014.01)

(52) U.S. Cl.
CPC ......... *H04N 19/176* (2014.11); *H04N 19/186* (2014.11); *H04N 19/61* (2014.11)

(56) References Cited

U.S. PATENT DOCUMENTS

| | | | | |
|---|---|---|---|---|
| 8,363,717 | B2* | 1/2013 | Togita | H04N 19/61 375/240.03 |
| 8,451,891 | B2* | 5/2013 | Seok | H04N 19/176 375/240.03 |
| 8,611,416 | B2* | 12/2013 | Hwang | H04N 19/176 375/240.02 |
| 8,787,445 | B2* | 7/2014 | Pore | H04N 19/61 348/14.13 |
| 8,848,801 | B2* | 9/2014 | Lainema | H04N 19/00781 375/240.24 |
| 8,867,613 | B2* | 10/2014 | Joshi | H04N 19/172 375/240.03 |
| 8,891,619 | B2* | 11/2014 | Leontaris | H04N 19/103 375/240.01 |
| 8,897,365 | B2* | 11/2014 | Reddy | H04N 19/126 375/240.03 |
| 9,071,822 | B2* | 6/2015 | Raveendran | H04N 5/144 |
| 9,241,159 | B2* | 1/2016 | Nakayama | H04N 19/176 |
| 9,445,110 | B2* | 9/2016 | Leontaris | H04N 19/15 |
| 9,473,792 | B2* | 10/2016 | Srinivasamurthy | H04N 19/46 |
| 9,479,786 | B2* | 10/2016 | Lu | H04N 19/176 |
| 9,538,190 | B2* | 1/2017 | Karczewicz | H04N 19/147 |
| 9,565,440 | B2* | 2/2017 | Li | H04N 19/124 |
| 9,571,828 | B2* | 2/2017 | Okawa | H04N 19/176 |
| 9,628,816 | B2* | 4/2017 | Ugur | H04N 19/42 |
| 9,661,329 | B2* | 5/2017 | Zhang | H04N 19/176 |
| 2002/0009146 | A1 | 1/2002 | Hall et al. | |
| 2006/0126728 | A1 | 6/2006 | Yu et al. | |
| 2006/0280242 | A1 | 12/2006 | Ugur | |
| 2009/0046778 | A1 | 2/2009 | Lee et al. | |
| 2011/0129162 | A1 | 6/2011 | Kim et al. | |
| 2012/0314764 | A1 | 12/2012 | Tidemann et al. | |
| 2014/0169480 | A1 | 6/2014 | Lachine et al. | |
| 2014/0301460 | A1 | 10/2014 | Karczewicz et al. | |
| 2014/0376621 | A1 | 12/2014 | Fukushima et al. | |
| 2016/0301939 | A1 | 10/2016 | Thirumalai et al. | |
| 2016/0301950 | A1 | 10/2016 | Jacobson | |
| 2016/0309149 | A1 | 10/2016 | Thirumalai et al. | |

OTHER PUBLICATIONS

International Search Report and Written Opinion—PCT/US2016/024016—ISA/EPO—dated Jun. 3, 2016.
VESA (Video Electronics Standards Association) "Display Stream Compression (DSC) Standard v1.1", VESA Standard, VESA, Us, vol. V1.1, Aug. 1, 2014 (Aug. 1, 2014), pp. 1-125, XP008177954 , Retrieved from the Internet: URL: http://www.vesa.org/vesa-standards/standards-summaries.
Mohsenian N., et al., "Single-Pass Constant and Variable-Bit-Rate MPEG-2 Video Compression" , IBM Journal of Research and Development, International Business Machines Corporation, New York, NY, US, vol. 43, No. 4, Jul. 1, 1999 (Jul. 1, 1999), pp. 489-509, XP002216512 , ISSN: 0018-8646.
Vetro A., et al., "Object-based Transcoding for Scalable Quality of Service," Circuits and Systems, 2000, Proceedings. ISCAS 2000 Geneva, The 2000 IEEE International Symposium on May 28-31, 2000, Piscataway, NJ, USA,IEEE, May 28, 2000 (May 28, 2000), vol. 4, pp. 17-20, XP010503526, DOI: 10.1109/ISCAS.2000. 858677 ISBN: 978-0-7803-5482-1.
Walls F., et al., "BDC-1: A Robust Algorithm for Display Stream Compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].

* cited by examiner

COMPLEX REGION DETECTION FOR DISPLAY STREAM COMPRESSION

INCORPORATION BY REFERENCE TO PRIORITY APPLICATION(S)

This application claims the benefit of U.S. Provisional Application No. 62/146,913, filed Apr. 13, 2015.

TECHNICAL FIELD

This disclosure relates to the field of video coding and compression, and particularly, to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, there is provided a method for detecting a complex region of an image, wherein a slice of the image includes a current block, a next block, and a previous block. The method may involve calculating a current complexity value for the current block, a next complexity value for the next block, and a previous complexity value for the previous block. The method may involve: detecting that the previous complexity value is less than a first threshold value, and that the next complexity value is greater than a second threshold value, wherein the second threshold value is greater than the first threshold value; and determining that neither a transition to the current block nor a transition to the previous block is a flat-to-complex region transition. The method may involve detecting a flat-to-complex region transition when transitioning to the next block in response to (i) detecting that the previous complexity value is less than the first threshold value, and that the next complexity value is greater than the second threshold value, and (ii) determining that neither the transition to the current block nor the transition to the previous block is a flat-to-complex region transition.

In another aspect, calculating the current complexity value for the current block, the next complexity value for the next block, and the previous complexity value for the previous block may involve, for each block among the current, next, and previous blocks, (i) applying a transformation (e.g., a discrete cosine transform (DCT) or a Hadamard transform) to determine transform coefficients and (ii) determining a defined absolute sum of the transform coefficients. In yet another aspect, the method may further involve adjusting a quantization parameter (QP) in response to detecting a flat-to-complex region transition.

In still another aspect, there is provided a device for detecting a complex region of an image, wherein a slice of the image includes a current block, a next block, and a previous block. The device may include a memory configured to store video information relating to the image. The device may include at least one processor (e.g., part of an integrated circuit (IC) and/or graphics processing unit (GPU)) coupled to the memory and configured to: calculate a current complexity value for the current block, a next complexity value for the next block, and a previous complexity value for the previous block; detect that the previous complexity value is less than a first threshold value, and that the next complexity value is greater than a second threshold value, wherein the second threshold value is greater than the first threshold value; determine that neither a transition to the current block nor a transition to the previous block is a flat-to-complex region transition; and detect a flat-to-complex region transition when transitioning to the next block in response to (i) detecting that the previous complexity value is less than the first threshold value, and that the next complexity value is greater than the second threshold value, and (ii) determining that neither the transition to the current block nor the transition to the previous block is a flat-to-complex region transition.

DETAILED DESCRIPTION

In general, the present disclosure relates to techniques of improving video compression techniques such as display stream compression (DSC). More specifically, this disclosure relates to systems and methods for detecting a transition from a flat or smooth region to a complex region of an image to be coded. Described herein are techniques for complex region detection in video data in the context of video compression techniques, such as, for example, DSC. Aspects of this disclosure relate to ensuring that underflow or overflow of the rate buffer during coding is avoided.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

The concepts of this disclosure may be integrated in or a be part of a codec (e.g., DSC) that includes several elements and/or modes aimed at encoding/decoding various types of content with substantially visually lossless performance. This disclosure provides a complex region detection algorithm that detects the transition from a smooth/flat region (e.g., a region that is easy to code) to a complex region (e.g., a region that is relatively difficult to code or requires a higher number of bits to code). When such a transition is detected, the quantization parameter (QP) used in the codec is increased to a high value in order to reduce the expected rate required to code the current block. This is desirable as the complexity of visual information in the complex region may mask artifacts more so than would occur for a smooth/flat region. In addition, the low rate is desirable to prevent the coder from spending too many bits on a complex block (e.g., well in excess of the target bitrate).

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second,"

"third," and so on) do not necessarily imply that the elements have a particular order. Rather, such ordinal words are merely used to refer to different elements of a same or similar type.

Figure 1A:
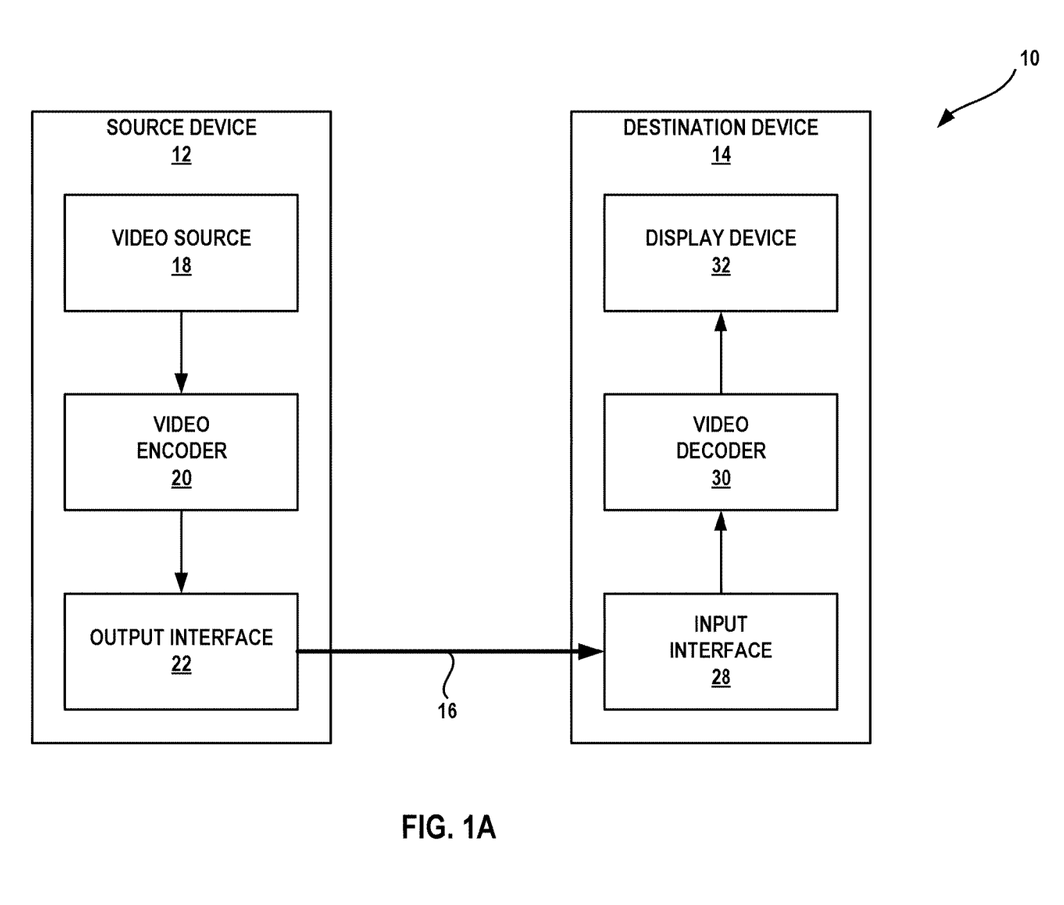
FIG. 1A is a block diagram illustrating an example video encoding and decoding system that may utilize techniques in accordance with aspects described in this disclosure.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
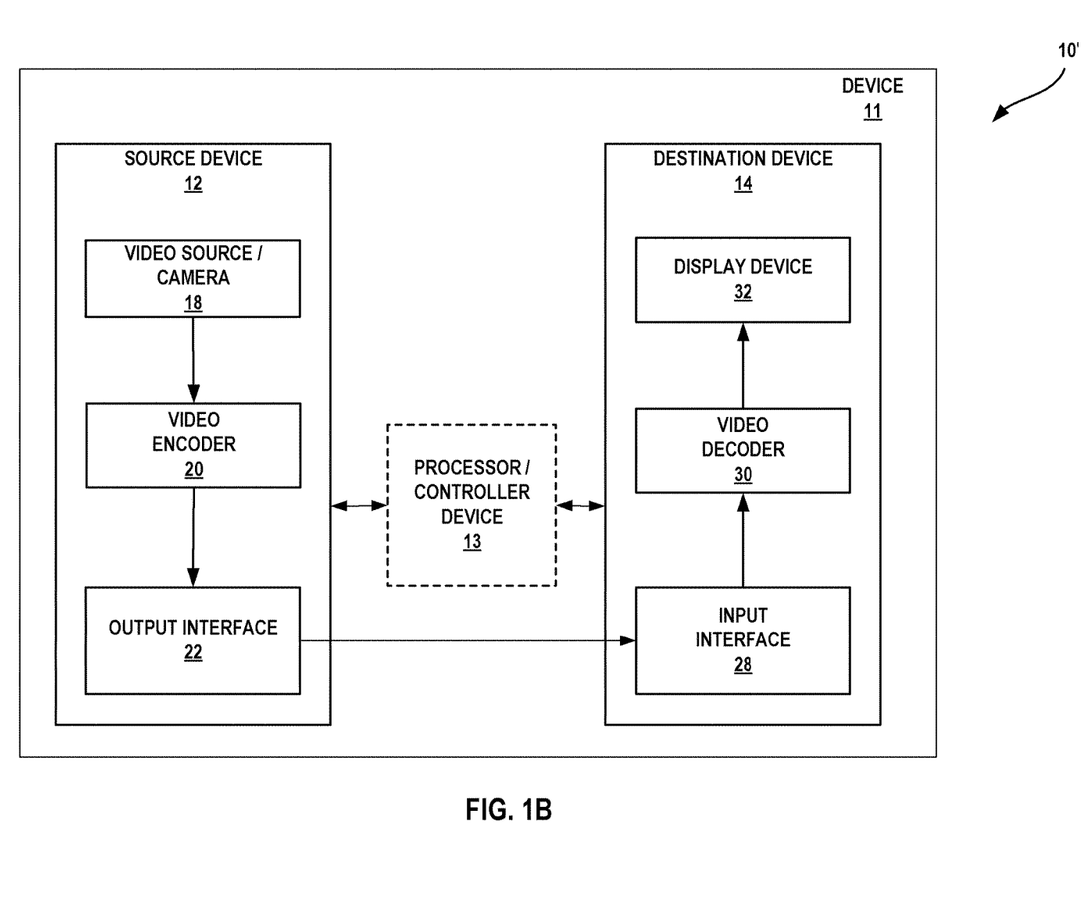
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
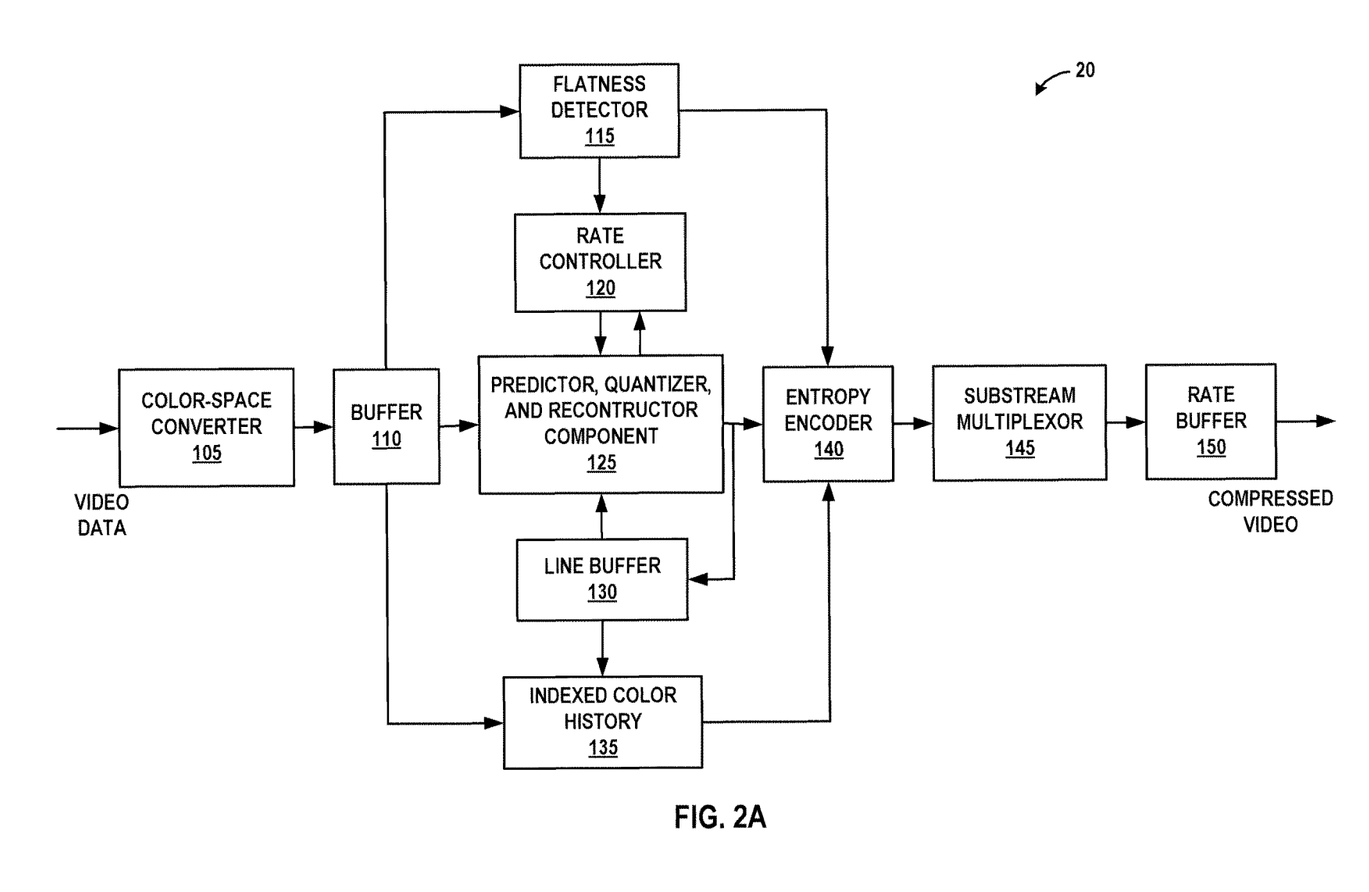
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space converter 105 may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCoCg) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

BF=((BufferCurrentSize*100)/BufferMaxSize)

It is noted that the above approach to calculating BF is merely exemplary, and that the BF may be calculated in any number of different ways, depending on the particular implementation or context.

The flatness detector 115 can detect changes from complex (i.e., non-flat) areas in the video data to flat (i.e., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
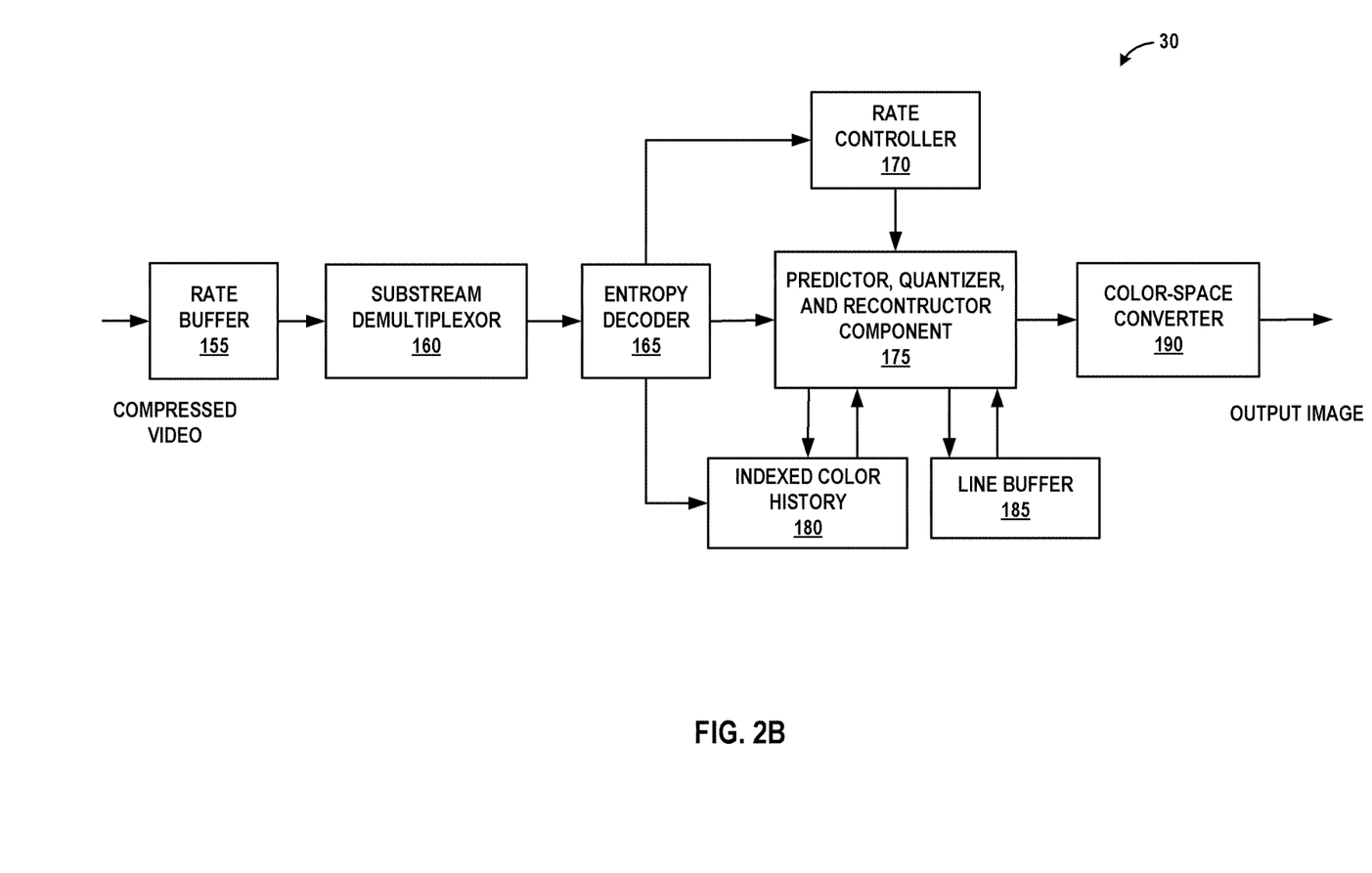
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

QP Calculation

In one approach, the QP for the current block (denoted as currQP) may be derived or calculated based on the following equation:

$$currQP = prevQ + QpAdj*(diffBits>0?1:-1),$$

where prevQP is the QP associated with the previous block, diffBits represents the difference between the previousBlockBits and targetBits, QpAdj is the QP offset value (e.g., QP adjustment value) that is calculated based on the magnitude of diffBits, previousBlockBits represents the number of bits used to code the previous block, and target-Bits represents a target number of bits in which to code the current block. When previousBlockBits>targetBits, diffBits is positive, and the current block QP may be derived by adding the offset value QpAdj to the prevQP value. In other words, the QP value does not decrease in value from the prevQP value when diffBits is positive. When previousBlockBits≤targetBits, diffBits is negative or zero, and currQP does not increase from the prevQP value. It is noted that the offset value QpAdj may be calculated, for example, as a function of diffBits in such a way that QpAdj monotonically increases as the magnitude of diffBits increases.

Figure 3:
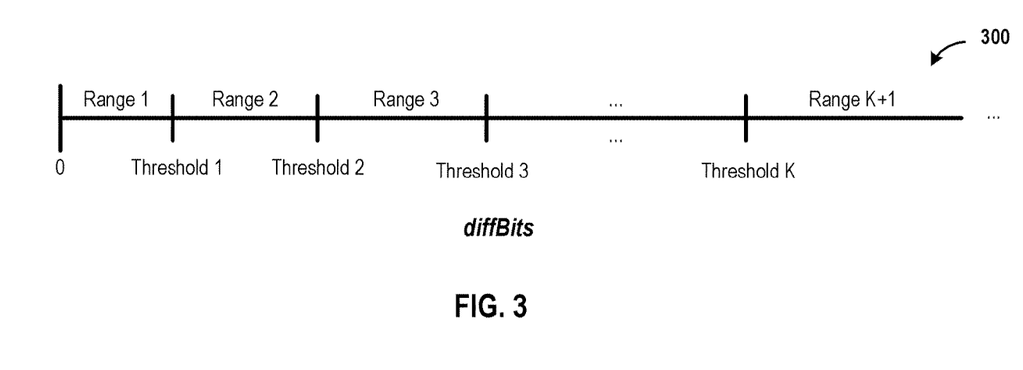
FIG. 3 shows an example approach to determining quantization parameter (QP) adjustment value(s).

One technique, referred to herein as a default technique, for calculating the QP adjustment value QpAdj will now be described with reference to FIG. 3. FIG. 3 provides a graph 300 including an axis on which values of diffBits starting a zero are plotted. In the default technique, when diffBits>0, diffBits may be classified into K+1 ranges using K threshold values. These threshold values are illustrated by the labels Threshold 1, Threshold 2, Threshold 3, . . . , and Threshold K and the ranges are illustrated by the labels Range 1, Range 2, Range 3, . . . , and Range K+1. In the default technique of FIG. 3, there is shown one approach to segmenting diffBits into K+1 ranges using K threshold values. Each range may be associated with a specific QpAdj value, where the QpAdj value increases as the range index increases. When diffBits≤0, the absolute value of diffBits may be classified into J+1 ranges using J threshold values (not illustrated), and there may be a specific QpAdj value assigned for each of the J+1 ranges.

In other aspects, the currQP value may be adjusted based on the fullness of the buffer (which may be represented in terms of buffer fullness BF), in order to prevent underflow and/or overflow of the buffer. In particular, when BF exceeds a certain threshold (e.g., $P_1$), currQP may be incremented by a fixed offset value (e.g., $p_1$). For example, currQP may be adjusted as follows: currQP+=$p_1$. Further, when BF falls below a certain threshold (e.g., $Q_1$), currQP may be decremented by $q_1$, e.g., currQP-=$q_1$. In certain aspect, a plurality of thresholds may be employed, and for each threshold there may be a corresponding offset value to adjust currQP.

When a transition from a complex region to a flat region is identified or when a flat region is identified, the currQP may be set to a low value (e.g., a value below a defined currQP value), as described in further detail below.

Detecting Transition from Flat to Complex Regions

Figure 4:
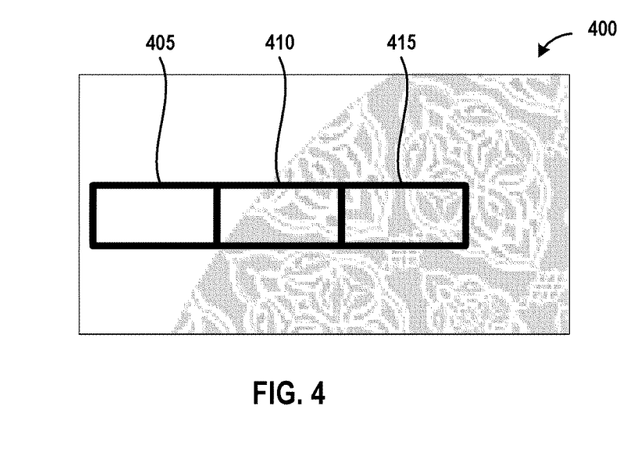
FIG. 4 illustrates an example transition from a flat region to a complex region within an image.

With reference to FIG. 4, one or more techniques may be utilized to detect a transition from a flat/smooth region to a complex region. FIG. 4 illustrates an example region of interest 400 which may be a frame or portion thereof, such as, for example, a slice of the frame. The region 400 may include and three successive blocks 405, 410, and 415. In this example, block 405 corresponds to a flat region/portion of the region 400, block 410 corresponds to a transition region/portion of the region 400, and block 415 corresponds to a complex region/portion of the region 400. As shown, the content of block 405 is flat, smooth, or uniform. The content of block 415 is textured and exhibits patterns that are not uniform throughout. The block 410 includes a transition from uniform to non-uniform content. As described below, a complexity calculation made be performed for each of the blocks 405, 410, and 415.

As used herein, a flat block may refer to a block which has a complexity value that is lower than a complexity threshold. The threshold at which a block is determined to be flat may be set based on various design criteria such as the number of bits required to code the block. Similarly, a non-flat or complex block may refer to a block which is not flat, e.g., has a complexity value which is greater than or equal to the complexity threshold. Various other categorizations of blocks may be employed based on the associated complexities of the blocks, and such categorizations may be ranges defined by thresholds in the complexity values of the blocks.

The terms flat and complex may also apply to regions other than blocks. In this case, although the regions may not be the same size as a block, e.g., the regions may not be a size which is discretely encoded/decoded, regions may also be categorized as flat or complex based on a complexity of the region. For example, a region may be referred to as a flat region if each block within that region is a flat block. However, a flat region may not have the same boundary as the block contained therein, and may the complexity of the region may be calculated over the entire region. Complex regions may be defined similarly. Thus, a region may be categorized as flat or complex by comparing a complexity value for the region to a complexity threshold, which may be different from the complexity threshold for blocks. Further, since regions may be divided into blocks for coding, the term region may be used herein conceptually to facilitate the understanding of various aspects of this disclosure.

As described above, in order to categorize a block as flat or complex, a complexity value for the block may be determined. The complexity value for a block may be determined according to various techniques, as long as the complexity value is representative of the difficulty of encoding the block, e.g., the number of bits that may be required to code the block without introducing visible artifacts.

Figure 5:
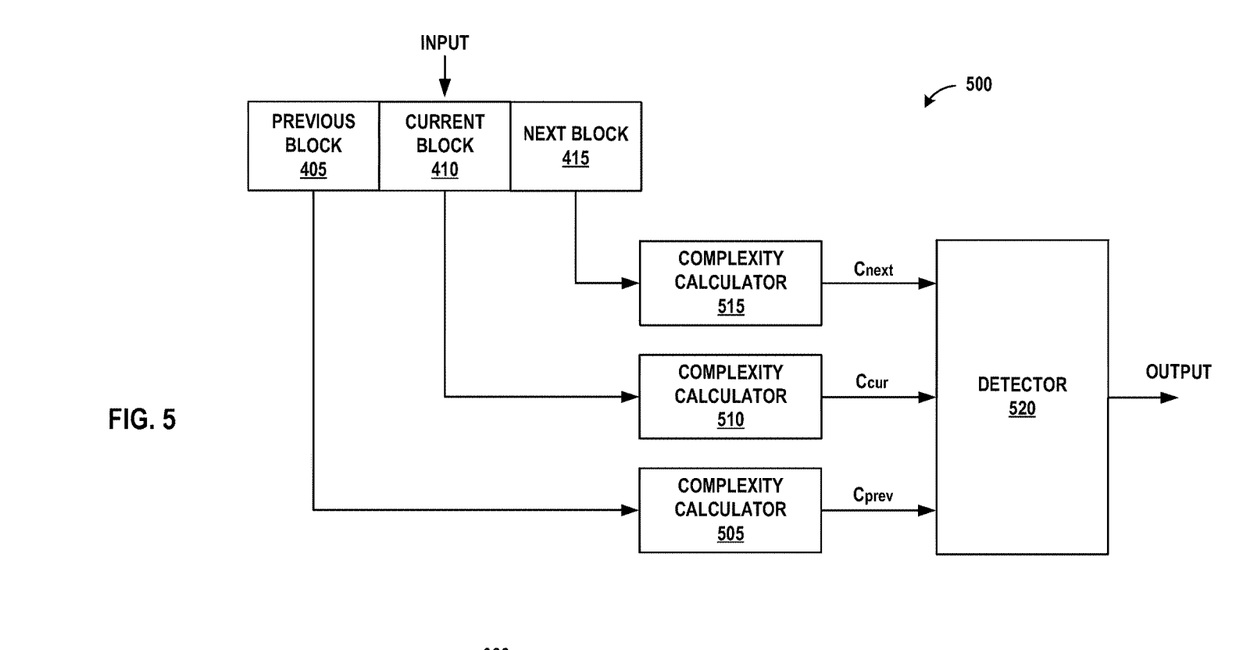
FIG. 5 shows an example system for detecting a flat-to-complex region transition.

The framework of the proposed flatness detection technique is shown in an example complexity detection system 500 of FIG. 5. The system 500 may receive as input the blocks 405, 410, and 415 of FIG. 4, or information regarding such blocks. In one implementation, the system 500 may perform a complexity calculation for each of the blocks 405, 410, and 415 to calculate per-block complexity values denoted as $C_{cur}$, $C_{next}$, and $C_{prev}$. For example, the system 500 may include complexity calculation units 505, 510, and 515 corresponding to each of the blocks 405, 410, and 415, respectively, and may output calculate complexity values $C_{prev}$, $C_{cur}$, and $C_{next}$, respectively, to a detector 520. In another implementation, fewer than three complexity values may be calculated for each block. For example, the encoder may buffer or store the "current" and "next" block complexity values at a given time block which will become the "previous" and "current" complexity values, respectively, for the next block time. In this way, only the "next" block complexity value will need to be calculated for the next time block. Stated differently, the encoder may buffer or store the "current" and "next" block complexity values at a first time block which will become the "previous" and "current" complexity values, respectively, at a second block time, such that only the "next" block complexity value is calculated at the second time block.

In related aspects, the complexity calculation units 505, 510, and 515, and/or the detector 520, may be separate components, part of the same component or processor of a codec, or software modules that be performed by one or more processors. The features of the system 500 may be may be implemented in hardware, software, firmware, or any combination thereof. In further related aspects, the system 500 may receive information regarding or relating to any number of successive blocks for an image or region of interest (e.g., four successive blocks in a slice) and may perform complexity calculations for each of the successive blocks.

In one aspect, the complexity of a block may be calculated by taking a frequency transform (e.g., a discrete cosine transform (DCT), Hadamard transform, etc.) of the pixels in the block. The frequency transform may result in a number of frequency coefficients which may be summed to generate the complexity value. In another aspect, the direct current (DC or zero-frequency) coefficient and/or one or more low frequency coefficients may not be included in the sum. Various other techniques for determining the complexity value, such as applying a color transformation before the frequency transform, may also be implemented.

In related aspects, the absolute value or absolute square value of the transform coefficients may be summed to calculate the complexity value for a block. In further related aspects, the luma channel may be used to calculate the complexity value, or both the luma/chroma channels may be used to calculate the complexity value.

In yet further related aspects, a subset of the transform coefficients may be considered while calculating the absolute sum or absolute square sum, i.e., less than all of the transform coefficients in the block may be considered in some example approaches.

In still further aspects, each transform coefficient may be multiplied with a weight, where the weight applied to each coefficient may vary or be constant. Then, the absolute value or absolute square value of the weighted coefficients may be calculated.

With reference once again to the example of FIG. 5, the detector 500 may determine, based on $C_{prev}$, $C_{cur}$, and $C_{next}$, whether blocks 405, 410, and 415 include a transition from a flat region to a complex region. For example, the output of the detector 500 may be a binary result, such as 0 to indicate that there is not a flat-to-complex region transition, and 1 to indicate that there is a flat-to-complex region transition.

The determination of whether there is transition from a flat region to a complex region may be performed by checking one or more conditions based on the complexity values of the successive blocks (e.g., blocks 405, 410, and 415) in a region of interest (e.g., region 400). In one embodiment, the determination of whether there is a flat-to-complex region transition is performed via checking the following Condition 1 and Condition 2.

$(C_{prev} < T_0) \&\& (C_{next} > T_1)$  Condition 1:

Regarding Condition 1, the thresholds $T_0$ and $T_1$ may be tuned based on the parameters of the codec. Preferably, the ordering $T_0 < T_1$ should be followed. In related aspects, detecting that there is transition from a flat region to a complex region may include determining that (i) a complexity value for the previous block 405 is less than (or less than or equal to) a first threshold (e.g., $T_0$), which is indicative of the previous block 405 corresponding to a flat region, and that (ii) a complexity value for the next block 415 is greater than (or greater than or equal to) a second threshold (e.g., $T_1$), which is indicative of the next block 415 corresponding to a complex region. Here, the indications that the previous block corresponds to a flat region and that the next block 415 corresponds to a complex region further indicate that there is transition from a flat region to a complex region in the current block 410, i.e., that the current block 410 is a transition block.

Figure 6:
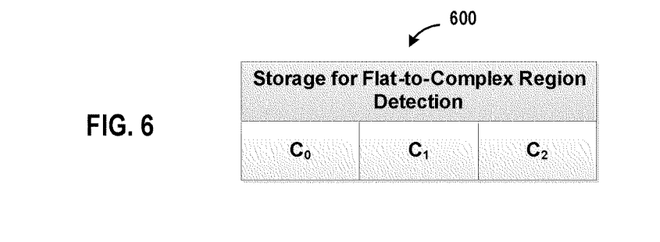
FIG. 6 illustrates an storage unit for flat-to-complex region detection.

$(C_0 = \text{false}, C_1 = \text{false}$  Condition 2:

Regarding Condition 2, the values $C_0$ and $C_1$ in Condition 2 are Boolean in nature and represent the previous history of flat-to-complex region detection, as shown in FIG. 6. For example, the values $C_0$ and $C_1$ for previous block times, as well as $C_2$ for a current block time, may be stored in a memory storage unit 600. In one aspect, at each block time, the complexity values are shifted left by one. In another aspect, the previous history of flat-to-complex region detection—namely, the values $C_0$ and $C_1$ for previous block times—are used to check Condition 2 above. In yet another aspect, if both parts of Condition 1 are met, then the value $C_2$ in FIG. 6 will be set to true. Even when a flat-to-complex region transition is detected, the QP used may be increased (compared to the previous flat block) at the transition block or the next block after the transition block in order to reduce the expected rate required to code the current/next block. It is noted, however, that the QP value at the transition block cannot be too high (e.g., exceeding a defined QP value), as the transition block contains both partially flat information and partially complex information. For example, when the QP value for a transition block exceeds a defined QP value, artifacts may be generated in the flat potion of the block which may be noticeable within an image reconstructed from the transition block.

As such, it may be desirable to delay increasing the QP until after the transition block. For example, the QP may be increased for the block immediately following the detected transition block (e.g., for block 415 which follows block 410). If the QP is high for the first entirely complex block (e.g., block 415), then the complexity may mask the presence of artifacts.

Accordingly, the next decision of whether the QP should be adjusted for the current block depends on the Boolean value of $C_1$. If $C_1$ is true, then the QP for the current block should be increased to a high value.

At the encoder side, at the beginning of processing each new block, the history of detection results is updated. That is, $C_1 \rightarrow C_0$, $C_2 \rightarrow C_1$, $C_2 = \text{false}$. This is done prior to computing the detection result for the current block. Essentially, this adds an offset of one block between detecting a flat-to-complex transition and adjusting the QP. As discussed above, this ensures that the QP will remain at a low value for the transition block. In addition, this ensures that multiple blocks in a row cannot be detected as flat-to-complex transitions.

In another example, the comparison operators in Condition 1 may be replaced with different comparison operators. For example, instead of $C_{prev} < T_0$, instead $C_{prev} \leq T_c$, may be used instead.

One advantage of the above embodiment is that the detection of flat-to-complex region transitions allows the encoder to increase the QP for complex regions. This will decrease the expected rate required to code the block, and the artifacts which result will be masked by the complexity of the region. Also, the result of the flat-to-complex transition detection can be signaled explicitly to the decoder in the encoded bitstream using one bit/block. This allows the decoder to adjust the QP without having to compute complexity values as is done in the encoder. Furthermore, the complexity calculations and look-ahead data utilized in the present technique for detecting flat-to-complex region transitions may also be utilized for detecting complex-to-flat region transitions, thereby realizing efficiencies for a fixed rate codec, such as DSC or the like. In one embodiment, there is provided a technique that may involve signaling a flat-to-complex transition using one bit. In related aspects, flat-to-complex is one of a set of possible flatness detections or classifications, which can be grouped together. For example, if there are four classes of flatness (e.g., flat-to-complex, complex-to-flat, somewhat flat, and very flat), then the result may be signaled with one of a set of 2-bit codes.

In one embodiment, when a flat-to-complex transition is identified, the QP value of the block may be set to a predefined value (e.g., a fixed high value) or the QP may be increased by a predefined increment or value (e.g. a fixed adjustment value).

Example Flowcharts for Detecting a Complex Region of an Image

Figure 7:
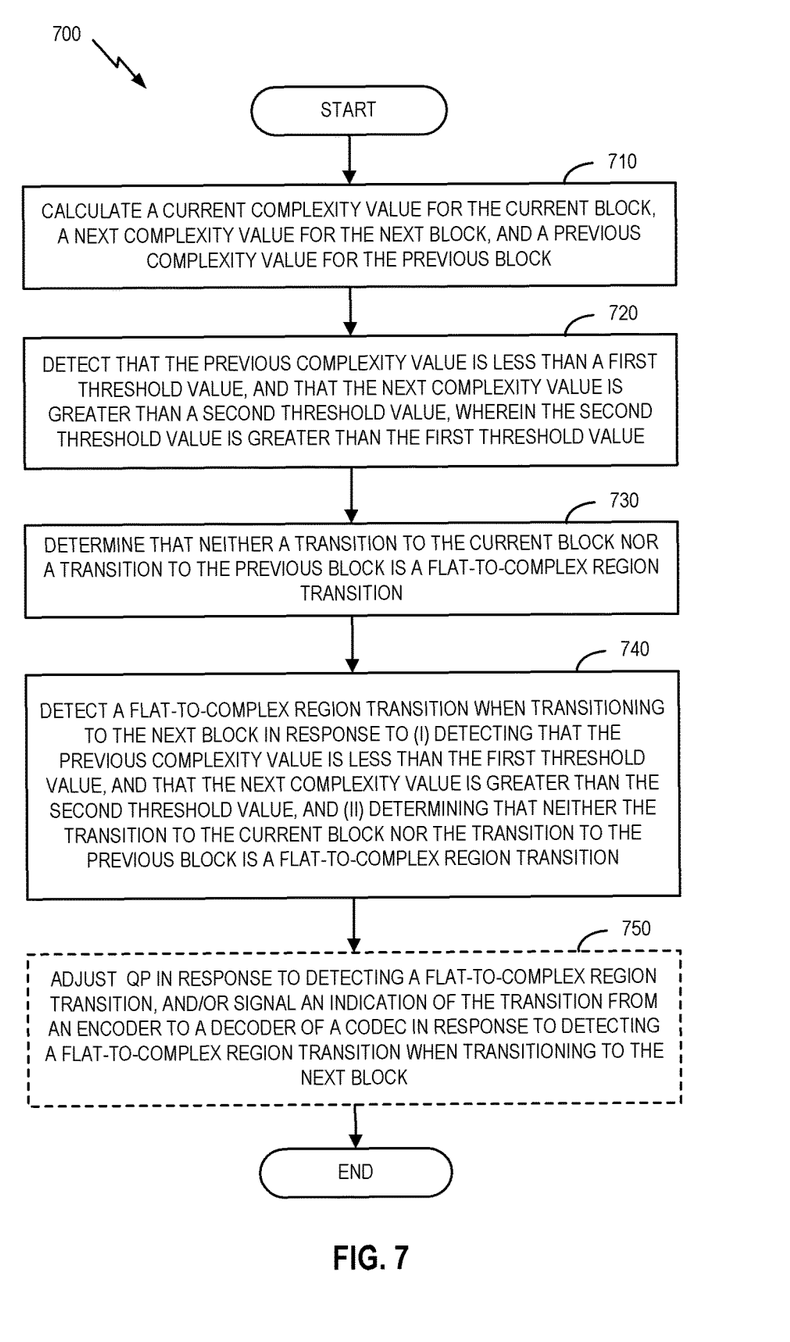
FIG. 7 is a flowchart illustrating an example method for detecting a complex region in an image, in accordance with aspects described in this disclosure.

With reference to FIG. 7, an example procedure for detecting a transition from a flat region to a complex region of an image will be described. A slice of the image may include a current block, a next block, and a previous block.

FIG. 7 is a flowchart illustrating a method 700 for coding video data, according to an embodiment of the present disclosure. The steps illustrated in FIG. 7 may be performed by a video encoder (e.g., the video encoder 20 in FIG. 2A), a video decoder (e.g., the video decoder 30 in FIG. 2B), or component(s) thereof, such as for example, the flatness detector 115, the rate controller 120, the predictor, quantizer, and reconstructor component 125, the entropy encoder 140, and the rate buffer 150. For convenience, method 700 is described as performed by a video coder (also simply referred to as coder), which may be the video encoder 20, the video decoder 30, or another component.

The coder or component(s) thereof may be implemented on device that includes an integrated global memory shared by a plurality of programmable compute units that includes a buffer, wherein the buffer may include a first-in-first-out (FIFO) buffer. The device may further include an integrated circuit (IC) that may include at least one processor or processor circuit (e.g., a central processing unit (CPU)) and/or a graphics processing unit (GPU), wherein the GPU may include one or more programmable compute units.

The method 700 begins at block 710. At block 710, the coder calculates a current complexity value for the current block, a next complexity value for the next block, and a previous complexity value for the previous block. Block 710 may involve the coder, for each block among the current, next, and previous blocks, (i) applying a transformation to determine transform coefficients and (ii) determining a defined absolute sum of the transform coefficients. Applying the transformation may involve applying one of a DCT and a Hadamard transform. Determining the defined absolute sum may involve determining one of an absolute sum and an absolute square sum of the transform coefficients.

At block 720, the coder detects that the previous complexity value is less than a first threshold value, and that the next complexity value is greater than a second threshold value, wherein the second threshold value is greater than the first threshold value.

At block 730, the coder determines that neither a transition to the current block nor a transition to the previous block is a flat-to-complex region transition. Wherein the coder performs block 730 based on the complexity values of the current, next, and previous blocks at a current block time, and/or complexity values of the current, next, and previous blocks at one or more previous block times.

At block 740, the coder detects a flat-to-complex region transition when transitioning to the next block in response to (i) detecting that the previous complexity value is less than the first threshold value, and that the next complexity value is greater than the second threshold value, and (ii) determining that neither the transition to the current block nor the transition to the previous block is a flat-to-complex region transition.

At block 750, the coder may optionally adjust a QP in response to detecting a flat-to-complex region transition, and/or signal an indication of the transition from an encoder to a decoder of a codec in response to detecting a flat-to-complex region transition when transitioning to the next block. The method 700 may end at block 740 or at block 750.

OTHER CONSIDERATIONS

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof.

Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CO-DEC). Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for detecting a complex region of an image, a slice of the image comprising a current block, a next block, and a previous block, the method comprising:
   receiving, via a receiver circuit, one or more video blocks comprising the slice of the image;
   storing, in a memory circuit, the one or more video blocks;
   calculating, via a hardware processor, a current complexity value for the current block, a next complexity value for the next block, and a previous complexity value for the previous block;
   determining, via the hardware processor, if the previous complexity value is less than a first threshold value, and that the next complexity value is greater than a second threshold value, wherein the second threshold value is greater than the first threshold value;
   determining, via the hardware processor, that neither a transition to the current block nor a transition to the previous block increases encoding demands;
   detecting, via the hardware processor, an increase in encoding demands when transitioning to the next block in response to (i) detecting that the previous complexity value is less than the first threshold value, and that the next complexity value is greater than the second threshold value, and (ii) determining that neither the transition to the current block nor the transition to the previous block increases encoding demands;
   coding the one or more video blocks based at least in part on the detected increase in encoding demands or determined lack of increase in encoding demands; and
   transmitting, via a transmitter circuit, the coded one or more video blocks to a device for display.

2. The method of claim 1, wherein calculating the current complexity value for the current block, the next complexity value for the next block, and the previous complexity value for the previous block comprises, for each block among the current, next, and previous blocks, (i) applying a transformation to determine transform coefficients and (ii) determining a defined absolute sum of the transform coefficients.

3. The method of claim 2, wherein applying the transformation comprises applying one of a discrete cosine transform (DCT) and a Hadamard transform.

4. The method in claim 3, further comprising applying a color transformation to each of the current, next, and previous blocks before applying one of the DCT transform and the Hadamard transform.

5. The method of claim 2, wherein determining the defined absolute sum comprises determining one of an absolute sum and an absolute square sum of at least a subset of the transform coefficients.

6. The method of claim 5, wherein determining one of an absolute sum and an absolute square sum comprises calculating one of an absolute sum and an absolute square sum of a subset of the transform coefficients, the subset not including at least one of a first transform coefficient pertaining to a direct current (DC) coefficient and a second transform coefficient pertaining to a low frequency coefficient.

7. The method of claim 1, further comprising adjusting a quantization parameter (QP) in response to detecting an increase in encoding demands.

8. The method of claim 7, wherein adjusting the QP comprises increasing the QP by QP adjustment value in response to detecting the increased encoding demands.

9. The method of claim 1, wherein the determining that neither the transition to the current block nor the transition to the previous block increases encoding demands is based on the complexity values of the current, next, and previous blocks at a current block time.

10. The method of claim 1, wherein the determining that neither the transition to the current block nor the transition to the previous block increases encoding demands is based on the complexity values of the current, next, and previous blocks at one or more previous block times.

11. The method of claim 1, further comprising, in response to detecting when transitioning to the next block an increase in encoding demands, signaling an indication of the transition from an encoder to a decoder of a codec.

12. The method of claim 1, further comprising tuning at least one of the first and second threshold values based on parameters of a fixed rate codec.

13. A device for detecting a complex region of an image, the device comprising:
a memory configured to store video information relating to the image, a slice of the image comprising a current block, a next block, and a previous block; and
at least one processor circuit coupled to the memory and configured to:
calculate a current complexity value for the current block, a next complexity value for the next block, and a previous complexity value for the previous block;
determine if the previous complexity value is less than a first threshold value, and that the next complexity value is greater than a second threshold value, wherein the second threshold value is greater than the first threshold value;
determine that neither a transition to the current block nor a transition to the previous block increases encoding demands;
detect an increase in encoding demands when transitioning to the next block in response to (i) detecting that the previous complexity value is less than the first threshold value, and that the next complexity value is greater than the second threshold value, and (ii) determining that neither the transition to the current block nor the transition to the previous block increases encoding demands; and
coding the video information based at least in part on the detected increase in encoding demands or determined lack of increase in encoding demands.

14. The device of claim 13, wherein the at least one processor circuit is further configured to calculate the current complexity value for the current block, the next complexity value for the next block, and the previous complexity value for the previous block comprises, for each block among the current, next, and previous blocks, via (i) applying a transformation to determine transform coefficients and (ii) determining a defined absolute sum of the transform coefficients.

15. The device of claim 14, wherein the at least one processor circuit is further configured to apply the transformation via applying one of a discrete cosine transform (DCT) and a Hadamard transform.

16. The device of claim 15, wherein the at least one processor circuit is further configured to apply a color transformation to each of the current, next, and previous blocks before applying one of the DCT transform and the Hadamard transform.

17. The device of claim 14, wherein the at least one processor circuit is further configured to determine the defined absolute sum via determining one of an absolute sum and an absolute square sum of at least a subset of the transform coefficients.

18. The device of claim 17, wherein the at least one processor circuit is further configured to determine one of an absolute sum and an absolute square sum via calculating one of an absolute sum and an absolute square sum of a subset of the transform coefficients, the subset not including at least one of a first transform coefficient pertaining to a direct current (DC) coefficient and a second transform coefficient pertaining to a low frequency coefficient.

19. The device of claim 13, wherein the at least one processor circuit is further configured to adjust a quantization parameter (QP) in response to detecting an increase in encoding demands.

20. The device of claim 19, wherein the at least one processor circuit is further configured to adjust the QP via increasing the QP by QP adjustment value in response to detecting the increased encoding demands.

21. The device of claim 13, wherein the at least one processor circuit is further configured to determine that neither the transition to the current block nor the transition to the previous block increases encoding demands based on the complexity values of the current, next, and previous blocks at a current block time.

22. The device of claim 13, wherein the at least one processor circuit is further configured to determine that neither the transition to the current block nor the transition to the previous block increases encoding demands based on the complexity values of the current, next, and previous blocks at one or more previous block times.

23. An apparatus for detecting a complex region of an image, a slice of the image comprising a current block, a next block, and a previous block, the apparatus comprising:
means for receiving one or more video blocks comprising the slice of the image;
means for storing the one or more video blocks;
means for calculating a current complexity value for the current block, a next complexity value for the next block, and a previous complexity value for the previous block;
means for determining if the previous complexity value is less than a first threshold value, and that the next complexity value is greater than a second threshold value, wherein the second threshold value is greater than the first threshold value;
means for determining that neither a transition to the current block nor a transition to the previous block increases encoding demands; and
means for detecting an increase in encoding demands when transitioning to the next block in response to (i) detecting that the previous complexity value is less than the first threshold value, and that the next complexity value is greater than the second threshold value, and (ii) determining that neither the transition to the current block nor the transition to the previous block increases encoding demands;
means for coding the one or more video blocks based at least in part on the detected increase in encoding demands or determined lack of increase in encoding demands; and means for transmitting the coded one or more video blocks to a device for display.

24. The apparatus of claim 23, wherein the means for calculating the current complexity value for the current block, the next complexity value for the next block, and the previous complexity value for the previous block comprises means for applying a transformation to determine transform coefficients, and means for determining a defined absolute sum of the transform coefficients, for each block among the current, next, and previous blocks.

25. The apparatus of claim 24, wherein the means for applying the transformation comprises means for applying one of a discrete cosine transform (DCT) and a Hadmard transform, and means for applying a color transformation to each of the current, next, and previous blocks.

26. The apparatus of claim 23, further comprising means for adjusting a quantization parameter (QP) in response to detecting the increased encoding demands.

27. A non-transitory computer readable storage medium having stored thereon video information relating to an image, wherein a slice of the image comprises a current block, a next block, and a previous block, wherein the storage medium further has stored thereon instructions that, when executed, cause a processor of a device to:
   calculate a current complexity value for the current block, a next complexity value for the next block, and a previous complexity value for the previous block;
   determine if the previous complexity value is less than a first threshold value, and that the next complexity value is greater than a second threshold value, wherein the second threshold value is greater than the first threshold value;
   determine that neither a transition to the current block nor a transition to the previous block increases encoding demands;
   detect an increase in encoding demands when transitioning to the next block in response to (i) detecting that the previous complexity value is less than the first threshold value, and that the next complexity value is greater than the second threshold value, and (ii) determining that neither the transition to the current block nor the transition to the previous block increases encoding demands; and
   coding one or more blocks of the image based at least in part on the detected increase in encoding demands or determined lack of increase in encoding demands.

28. The non-transitory computer readable storage medium of claim 27, further having stored thereon instructions that, when executed, cause the processor to calculate the current complexity value for the current block, the next complexity value for the next block, and the previous complexity value for the previous block via, for each block among the current, next, and previous blocks, applying a transformation to determine transform coefficients and determining a defined absolute sum of the transform coefficients.

29. The non-transitory computer readable storage medium of claim 28, further having stored thereon instructions that, when executed, cause the processor to apply the transformation via applying one of a discrete cosine transform (DCT) and a Hadmard transform, and applying a color transformation to each of the current, next, and previous blocks.

30. The non-transitory computer readable storage medium of claim 27, further having stored thereon instructions that, when executed, cause the processor to adjust a quantization parameter (QP) in response to detecting the increased encoding demands.

* * * * *